United States Patent Office 2,767,210
Patented Oct. 16, 1956

2,767,210

PREPARATION OF 2-(3-AMINO-2,4,6-TRIIODO-BENZYL)-3-HYDROXY BUTYRIC ACID

Henri Morren, Forest-Brussels, Belgium

No Drawing. Application May 14, 1954,
Serial No. 429,963

Claims priority, application Belgium July 18, 1953

8 Claims. (Cl. 260—519)

This invention relates to a novel iodinated organic compound and its preparation.

Some iodinated organic compounds capable of accumulating in the gall bladder and of rendering it opaque to X-rays must be administered by intravenous injection whereas others may be absorbed orally. The most effective of these latter compounds are those having the general formula:

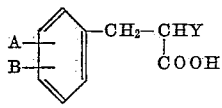

in which Y is selected from the group consisting of a straight hydrocarbon chain and a benzene nucleus, A is selected from the group of radicals consisting of an amine radical and a hydroxyl radical, and B is at least two and not more than three atoms of iodine.

I have found that by replacing in the above formula the Y substituent by an organic residue containing an hydroxyl radical, more particularly in the form of —CHOH—CH$_3$, a compound is obtained which when administered orally may be used to produce surprisingly clear defined roetgenograms of the gall bladder. The new compound 2-(3-amino-2,4,6-triiodobenzyl)-3-hydroxy butyric acid having the formula

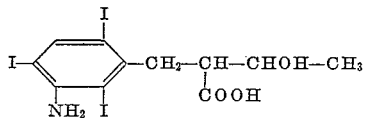

is obtained as a crystalline chamois colour powder, containing 64–64.5% iodine (theoretical iodine content 64.9%). This product melts at 208° C. (instantaneous melting point) and has opaque making characteristics superior to those of hitherto known compounds.

The product may be prepared as shown below by direct reduction with hydrogen in the presence of a catalyst of ethyl 3-nitrobenzal-acetylacetate (having a structure as shown in Formula I below) to ethyl 2-(3-amino-benzyl)-3-hydroxybutyrate (having a structure of the type shown in Formula III which relates to the corresponding isopropylester), iodination of the latter and saponification of the tri-iodinated ester.

I have found that the tri-iodinated compound may be more readily purified by carrying out the reduction in two stages. In accordance with my invention in the first stage the ketone group of the substituted ethyl acetylacetate is reduced with aluminum isopropoxide, and this reduction is accompanied by a transesterification so that isopropyl 2-(3-nitrobenzal)-3-hydroxybutyrate is obtained. In the second stage this latter compound is reduced to isopropyl 2-(3-amino-benzyl)-3-hydroxybutyrate by means of hydrogen under pressure in the presence of a catalyst preferably selected from the group consisting of platinum black, palladium black and Raney nickel. The synthesis according to the invention is represented by the following scheme which depicts also the preparation of the compound I by the reaction of 3-nitrobenzaldehyde and ethyl acetylacetate by the method disclosed by Ruhemann in the Journal of the Chemical Society of London, volume 83, 1903, page 719.

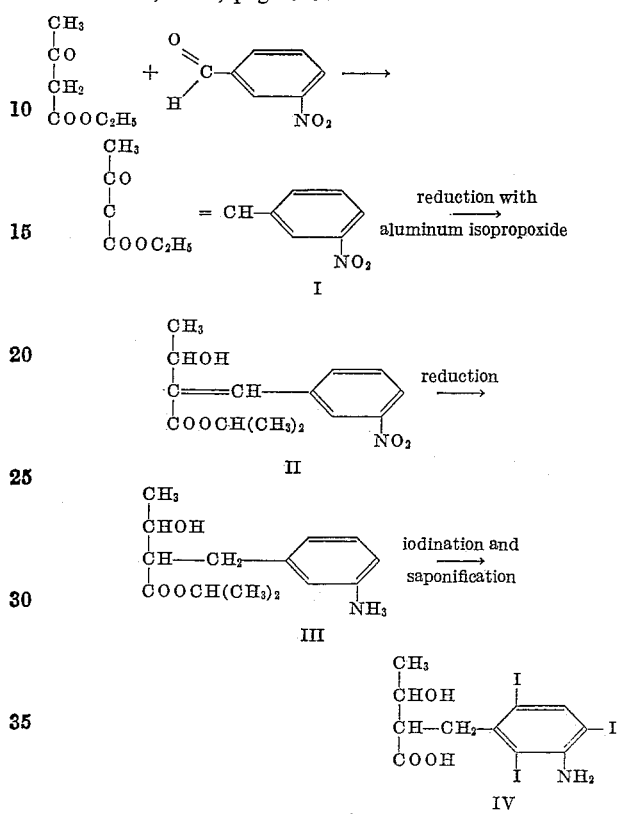

The invention will now be described with reference to the following example.

Example

Isopropyl 2-(3-nitrobenzal)-3-hydroxybutyrate (Formula II) is prepared from ethyl 3-nitrobenzal-acetylacetate (Formula I) by the method described in "Organic Reactions" volume 2, (1944, J. Wiley and Sons), page 203. 105.2 grams of the compound having the Formula I are reacted with a solution containing 80 grams of aluminum isopropoxide in 400 mls. of dry isopropanol distilled over sodium. The product having the Formula II is obtained quantitatively in the form of a viscous oil.

The oil is dissolved in 500 mls. of ethyl acetate and poured into a 2000 mls. capacity rotative stainless steel autoclave. 15 grams of freshly prepared Raney nickel kept under alcohol are added and hydrogen is introduced into the autoclave until the pressure therein reaches 40 kilograms per square centimeter. While the autoclave is kept rotating the temperature is quickly raised to about 60–65° C. and this temperature is maintained for about 90 minutes. The absorption of hydrogen which takes place steadily decreases to zero at the end of this period. After cooling, the catalyst is filtered off, the solvent evaporated and the residue allowed to crystallize. The residue which weighs about 90 grams is purified by dissolving it in 200 mls. of dry benzene at a temperature of 70° C. whereafter 100 mls. of dry hexane are added. After crystallization and filtration, the crystals are washed with 50 mls. of a 1:1 mixture of benzene and hexane and after drying in vacuo 73 grams of the compound III having a melting point of 87–88° C. are obtained.

Percentage of nitrogen calculated on $C_{14}H_{21}O_3N$: 5.57.
Percentage of nitrogen found: 5.55.

The iodination of the compound III may be carried out by means of iodine chloride in a suitable solvent such as acetic acid and diluted hydrochloric acid, or by means of iodine in an alkaline medium. The process is described below by way of example with reference to iodination with iodine chloride in acetic acid. 75.3 grams (0.3 mole) of the compound III are dissolved at room temperature in 660 mls. of glacial acetic acid. To the solution while it is subjected to violent shaking, there is added in the course of 60 minutes a solution containing 200 grams of iodine chloride in 240 mls. of glacial acetic acid. The temperature rises slightly and thereafter remains at 30-35° C. Agitation is carried out for a further 30 minutes following the introduction of the iodine chloride, whereafter 1300 mls. of water are added over a period of 60 minutes and agitation is maintained for a further 60 minutes. With continuous stirring the temperature is then raised to about 80° C. in the course of 90 minutes. Cooling is thereafter allowed to take place to about 40° C. Excess iodine chloride is removed by means of about 250 mls. of an aqueous saturated solution of sulphur dioxide. The solution which covers the resinous compound is decanted and the compound washed several times with water. The compound represents the crude tri-iodinated isopropyl ester.

The ester is dissolved in 400 mls. of industrial ethyl alcohol and saponified by the addition of 120 mls. of a 40% caustic soda solution and boiling for one hour. 400 mls. of water are then added and the alcohol is evaporated in vacuo at the temperature of the water-bath. A further 500 mls. of water are added, the solution is purified with charcoal at 50° C. and filtered. The solution is allowed to cool and acidified by means of aqueous sulphur dioxide solution. The brown precipitate is separated by filtering, washed thoroughly with water and redissolved in 1000 mls. of a 2% caustic soda. The solution thus obtained is filtered, again subjected to treatment with charcoal and refiltered. The clear filtrate is acidified with an aqueous solution of sulphur dioxide, the precipitate is first drained off and thereafter dried in vacuo to constant weight. 143 grams of a compound melting at 205° C. (instantaneous melting point), and having an iodine content of 62.5% (theoretical iodine content 64.9%) are obtained. The crude product is purified by recrystallization from aqueous alcohol and 108 grams of the compound IV having an instantaneous melting point of 208° C. and containing approximately the theoretical proportion of iodine are finally obtained.

I claim:

1. Process for preparing 2-(3-amino-2,4,6-triiodobenzyl)-3-hydroxybutyric acid having the formula:

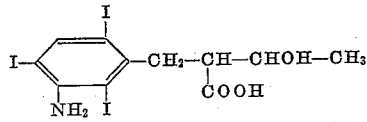

which comprises saponifying isopropyl 2-(3-amino-2,4,6-triiodobendyl)-3-hydroxybutyrate with caustic soda and purifying the resulting acid by repeated operations comprising dissolving in water, treating with charcoal and precipitating by means of an aqueous solution of sulphur dioxide, the purification being completed by recrystallization from an aqueous alcoholic solution.

2. A process for preparing

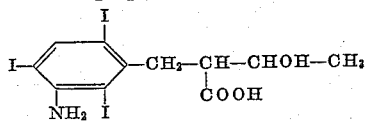

which comprises saponifying isopropyl 2-(3-amino-2,4,6-triiodobenzyl)-3-hydroxybutyrate with caustic soda and purifying the resulting acid by repeated operations comprising dissolving in water, treating with charcoal, precipitating by means of an aqueous solution of sulphur dioxide, dissolving in a dilute solution of caustic soda, treating with charcoal, precipitating by means of an aqueous solution of sulphur dioxide, and recrystallizing from an aqueous alcoholic solution.

3. A process for preparing

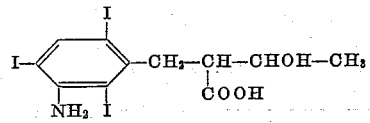

which comprises iodinating isopropyl 2-(3-amino-benzyl)-3-hydroxybutyrate to produce isopropyl 2-(3-amino-2,4,6-triiodobenzyl)-3-hydroxybutyrate, saponifying said isopropyl 2-(3-amino-2,4,6-triiodobenzyl)-3-hydroxybutyrate with caustic soda, and purifying the resulting acid by repeated operations comprising dissolving in water, treating with charcoal, precipitating by means of an aqueous solution of sulphur dioxide, and recrystallizing from an aqueous alcoholic solution.

4. Process according to claim 3 in which the iodinating agent is selected from the group consisting of iodine chloride in a solvent therefor and iodine in an alkaline medium.

5. Process as defined in claim 4 in which the solvent for the iodine chloride is selected from the group consisting of acetic acid and diluted hydrochloric acid.

6. A process for preparing

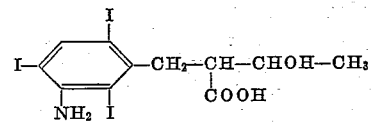

which comprises reducing isopropyl 2-(3-nitrobenzal)-3-hydroxybutyrate with hydrogen in the presence of a catalyst to form isopropyl 2-(3-amino-benzyl)-3-hydroxybutyrate, iodinating said isopropyl 2-(3-amino-benzyl)-3-hydroxybutyrate to form isopropyl 2-(3-amino-2,4,6-triiodobenzyl)-3-hydroxybutyrate, saponifying said isopropyl 2-(3-amino-2,4,6-triiodobenzyl)-3-hydroxybutyrate with caustic soda, and purifying the resulting acid by repeated operations comprising dissolving in water, treating with charcoal, precipitating by means of an aqueous solution of sulphur dioxide, and recrystallizing from an aqueous alcoholic solution.

7. Process as defined in claim 6 in which the catalyst is selected from the group consisting of platinum black, palladium black, and Raney nickel.

8. A process for preparing

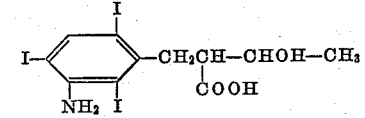

which comprises reducing ethyl 3-nitro-benzalacetylacetate with aluminum isopropoxide to form isopropyl 2-(3-nitrobenzal)-3-hydroxybutyrate, reducing said isopropyl 2-(3-nitrobenzal)-3-hydroxybutyrate with hydrogen in the presence of a catalyst to form isopropyl 2-(3-amino-benzyl)-3-hydroxybutyrate, iodinating said isopropyl 2-(3-amino-benzyl)-3-hydroxybutyrate to form isopropyl 2-(3-amino-2,4,6-triiodobenzyl)-3-hydroxybutyrate, saponifying said isopropyl 2-(3-amino-2,4,6-triiodobenzyl)-3-hydroxybutyrate with caustic soda, and purifying the resulting acid by repeated operations comprising dissolving in water, treating with charcoal, precipitating by means of an aqueous solution of sulphur dioxide, and recrystallizing from an aqueous alcoholic solution.

References Cited in the file of this patent
UNITED STATES PATENTS 2,705,726    Archer _____ Apr. 5, 1955

OTHER REFERENCES

Lewis et al.: J. A. C. S., vol. 71, pp. 5753–5 (1949).
Papa et al.: J. A. C. S., vol. 72, pp. 4907–9 (1950).